U S011532933B2

(12) United States Patent
Du et al.

(10) Patent No.: US 11,532,933 B2
(45) Date of Patent: Dec. 20, 2022

(54) CURRENT CONTROL AND CIRCUIT PROTECTION FOR DISTRIBUTED ENERGY RESOURCES

(71) Applicant: ABB Schweiz AG, Baden (CH)

(72) Inventors: Yu Du, Apex, NC (US); Li Qi, Cary, NC (US); Tong Wu, Västerås (SE)

(73) Assignee: ABB Schweiz AG, Baden (CH)

( * ) Notice: Subject to any disclaimer, the term of this patent is extended or adjusted under 35 U.S.C. 154(b) by 304 days.

(21) Appl. No.: 16/682,300

(22) Filed: Nov. 13, 2019

(65) Prior Publication Data

US 2021/0143630 A1 May 13, 2021

(51) Int. Cl.
*H02M 5/04* (2006.01)
*H02H 5/04* (2006.01)
*H02J 7/00* (2006.01)

(52) U.S. Cl.
CPC ........... *H02H 5/048* (2013.01); *H02J 7/0014* (2013.01); *H02J 7/0026* (2013.01); *H02J 7/0091* (2013.01)

(58) Field of Classification Search
CPC ...... H02J 7/0014; H02J 7/0026; H02J 7/0091; H02J 7/36; H02J 3/32; H02H 5/048
See application file for complete search history.

(56) References Cited

U.S. PATENT DOCUMENTS

| 2013/0221926 A1* | 8/2013 | Furtner | H02J 7/0019 |
| | | | 320/128 |
| 2015/0115736 A1* | 4/2015 | Snyder | H02J 7/0021 |
| | | | 307/115 |
| 2016/0322805 A1* | 11/2016 | Franke | H02H 3/0935 |
| 2020/0343755 A1* | 10/2020 | Jang | H01M 10/486 |

FOREIGN PATENT DOCUMENTS

| CN | 102 447 292 A | 5/2012 |
| EP | 3 379 725 A1 | 9/2018 |

OTHER PUBLICATIONS

European Patent Office, Extended European Search Report for related EP 20206962.1, dated Mar. 22, 2021, 7 pages.
(Continued)

*Primary Examiner* — Adolf D Berhane
*Assistant Examiner* — Afework S Demisse
(74) *Attorney, Agent, or Firm* — Armstrong Teasdale LLP

(57) ABSTRACT

According to one aspect of the present disclosure, an energy storage system includes one or more power sources, one or more energy storage components, and one or more solid state circuit breakers disposed between the one or more power sources and the one or more energy storage components such that electrical power is exchanged between the one or more power sources to the one or more energy storage components through the one or more solid state circuit breakers. The energy storage system also includes a controller configured to operate the one or more solid state circuit breakers to control current exchanged with the one or more energy storage components and protect the one or more energy storage components from the one or more power sources during a fault condition.

20 Claims, 9 Drawing Sheets

(56) References Cited

OTHER PUBLICATIONS

Li et al., "Integration and Energy Management of Largescale Lithium-ion Battery Energy Storage Station," 2012 15th International Conference on Electrical Machines and Systems (ICEMS), Sapporo, 2012, 6 pages.
Li et al., "Development of DC/DC Converter for Battery Energy Storage Supporting Railway DC Feeder Systems," IEEE Transactions on Industry Applications, 2016, 7 pages.
Hamidi et al., "Stability Analysis of a DC-DC Converter for Battery Energy Storage System Feeding CPL," 2015 IEEE International Telecommunications Energy Conference (INTELEC), Osaka, 2015, 5 pages.
Yanniello, "Eaton's Power Electronics Portfolio," Jun. 27, 2017, 29 pages.
Abb, "Low-voltage products and solutions. Batteries and Super Capacitors Energy Storage Systems (ESS)," 2016, 48 pages.
TE Connectivity, "EVC 250 Main Contactor, A high-voltage contactor for hybrid- and battery-electric vehicles (HEV, PHEV, BEV)," 2014, 13 pages.
Office of Naval Research, "High Power Solid State Circuit Protection for Power Distribution and Energy Storage," ONR BAA Announcement # ONRBAA13-016, May 21, 2013, 27 pages.

\* cited by examiner

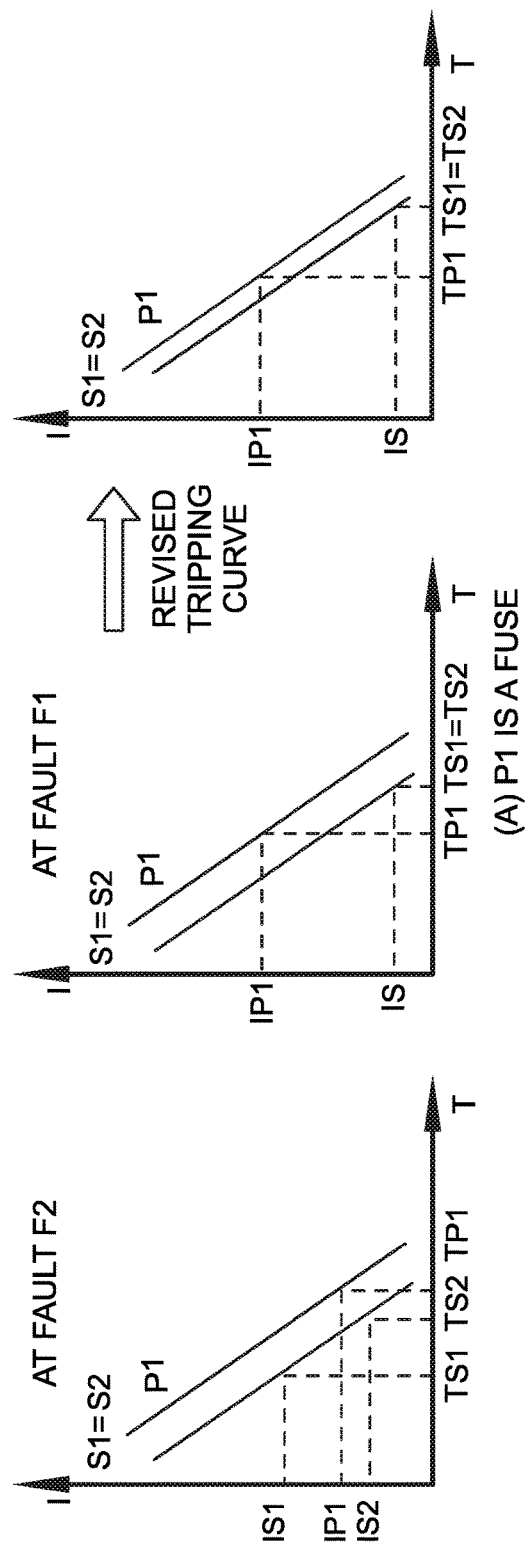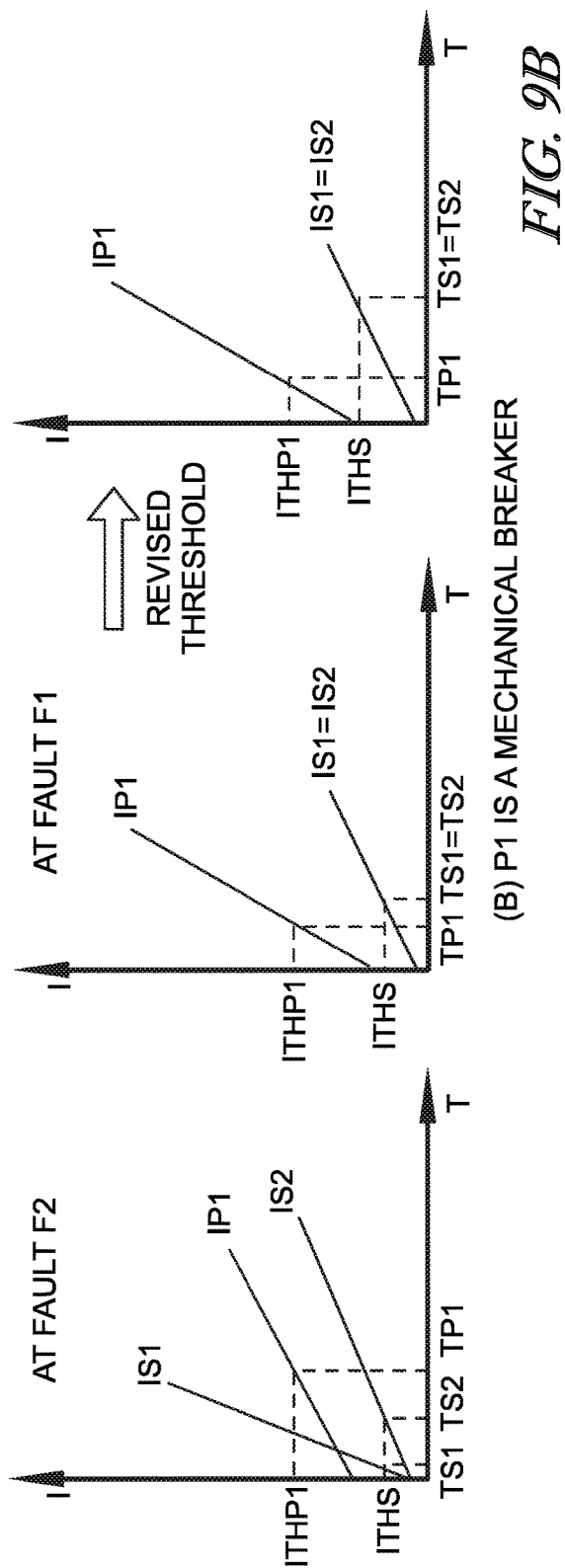

CURRENT CONTROL AND CIRCUIT PROTECTION FOR DISTRIBUTED ENERGY RESOURCES

TECHNICAL FIELD

The present subject matter relates to circuit protection, and more particularly, to solid state circuit breakers.

BACKGROUND

Often times, energy storage systems experience fluctuations in current delivered to certain components such as batteries configured into battery racks within a battery energy storage system (BESS). Occurrences of overcurrent may damage the batteries and/or other common components of BESSs. A conventional method for addressing current imbalance amongst battery racks is to arrange a DC-DC converter with each battery rack such that the current supplied to each rack may be controlled. However, DC-DC converters are relatively expensive, may decrease system efficiency, and increase the complexity of the energy storage system. Alternatively, current imbalances may be addressed by reducing nominal current of individual racks while oversizing the number of battery racks needed to meet application-specific system parameters. According to this conventional method, the battery racks tolerate a certain amount of current imbalance by operating well below overcurrent thresholds while the overall system maintains the same total charging and discharging currents. Oversizing a BESS may represent significant added cost because additional batteries are expensive.

Further, in a conventional BESS, fuses are implemented widely for low cost and reliable overcurrent protection. Sophisticated combinations of high-speed fuses and time-delay fuses at varying locations may be used to protect batteries, cables, and other BESS equipment against short-circuit and overcurrent faults. Fuses exhibit fixed time current curves (TCCs) or melting curves such that it is often difficult to implement fully coordinated circuit protection and selectivity at all fault currents utilizing fuses alone.

The present disclosure contemplates deploying one or more solid state circuit breakers (SSCBs) wherein each SSCB has an on/off functionality. This disclosure further contemplates controlling SSCBs to increase or decrease currents delivered to one or more targeted battery racks in order to mitigate overcurrent and/or over-temperature events as well as control state-of-charge for battery racks within a BESS. As a result, conventional methods of overcurrent protection and the drawbacks associated therewith may be omitted. The SSCBs may also be deployed in conjunction with conventional fuses and/or mechanical breakers in order to extend the lives of the conventional circuit protection components.

The description provided in the background section should not be assumed to be prior art merely because it is mentioned in or associated with the background section. The background section may include information that describes one or more aspects of the subject technology.

SUMMARY

According to one aspect of this disclosure, an energy storage system includes one or more power sources, one or more energy storage components, and one or more solid state circuit breakers disposed between the one or more power sources and the one or more energy storage components such that electrical power is exchanged between the one or more power sources to the one or more energy storage components through the one or more solid state circuit breakers. The energy storage system also includes a controller configured to operate the one or more solid state circuit breakers to control current exchanged with the one or more energy storage components and protect the one or more energy storage components from the one or more power sources during a fault condition.

According to another aspect of the present disclosure, a method of protecting an energy storage system may include directing power through at least one solid state circuit breaker to exchange the power between at least one power converter and a plurality of energy storage components, detecting a state of charge and a temperature for each of the plurality of energy storage components, and operating the at least one solid state circuit breaker to control at least one of the state of charge and the temperature for each of the plurality of energy storage components.

Yet another aspect of the present disclosure contemplates a circuit protection system including a power source electrically coupled with a load, a first circuit breaker having an adjustable time current curve, and a second circuit breaker or fuse, where the second circuit breaker or fuse has a fixed time current curve. This aspect of the disclosure further includes a controller coupled to the first circuit breaker and configured to adjust the time current curve in response to protection parameters.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 9A represents overload protection responses at first and second faults for an example embodiment wherein P1 of FIG. 8 is a fuse; and FIG. 9B represents overload protection responses at first and second faults for an example embodiment wherein P1 of FIG. 8 is a mechanical circuit breaker;

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Figure 1:
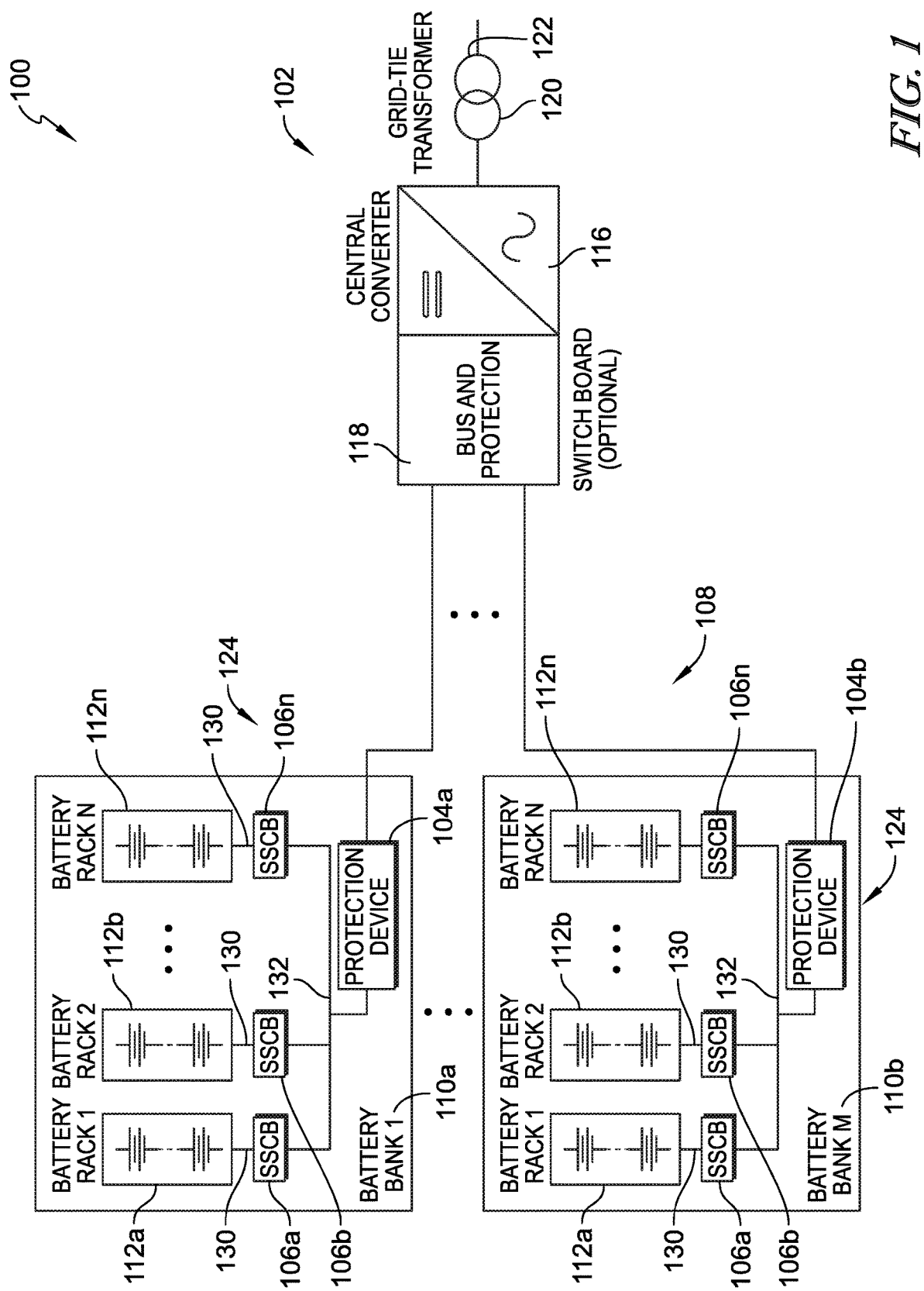
FIG. 1 is a diagram illustrating an example embodiment of a system and method of circuit protection for one or more battery racks implemented with a power conditioning module, one or more circuit protection devices, and one or more SSCB(s)

Referring now to FIG. 1, a system and method of circuit protection 100 is implemented to include a power conditioning module 102, one or more circuit protection devices 104a, . . . 104n, and one or more solid state circuit breakers (SSCBs) 106a, 106b, . . . 106n. In this example embodiment, the system and method of circuit protection 100 is applied to a battery energy storage system (BESS) 108 comprising a plurality of battery banks 110a, . . . 110m. Each of the battery banks 110 comprises a number of battery racks 112a, 112b, . . . 112n. Still further, each battery rack 112 may comprise one or more individual batteries 114. In alternative embodiments, the one or more individual batteries 114 may be replaced, supplemented by, and/or combined with any other suitable energy storage devices, such as electric double layer capacitors, ultracapacitors, supercapacitors, lithium-ion capacitors, and the like.

The power conditioning module 102 comprises a power converter 116 and switchboard 118 connecting the converter 116 to each of the circuit protection device(s) 104. A transformer 120 electrically couples the converter 116 and the power conditioning module 102 to an electrical grid and/or another suitable power source 122. The SSCB(s) 106 may provide current control, current balance, overcurrent protection, and/or thermal overload protection for large-scale distributed energy resources 124, such as the BESS 108 shown in FIG. 1. The method 100 further includes techniques to turn on and off one or more solid state switches 146 (see FIG. 4) in selected ones of the SSCB(s) 106 to increase or decrease (according to the desirability at particular times during particular applications) current exchanged with the associated battery rack(s) 112. The system and method of circuit protection 100 facilitates energy flow that is bi-directional (i.e., the BESS 108, in conjunction with the power converter 116, operates in both charging and discharging scenarios). Therefore, the system and method of circuit protection 100 described hereinthroughout may operate to improve balance for charging and discharging current from the battery rack(s) 112, particularly, in response to unbalance current or thermal conditions. This may result in improved health and increased service life of the BESS 108. The system and method 100 may be a cost effective solution for circuit protection through providing integrated control and protection functionality with the SSCB(s) 106. Comparatively, conventional mechanical breakers cannot switch DC current frequently, suffering from relatively long operating time and relatively short operational lifetime. The system and method 100 may also include adjusting one or more tripping characteristics (see FIGS. 9A and 9B) of the SSCB(s) 106 to improve system reliability and availability.

The system and method 100 of the present disclosure may use the SSCB(s) 106 to provide a combination of both current control and short circuit protection for distributed energy resources, such as the BESS 108. In an example prior art system, a relatively low capacity BESS (e.g., less than 100 kWh), such as those utilized in electric vehicles and/or residential photovoltaic applications (e.g., solar panels), a single battery string with numerous parallel and series connected cells is controlled directly by the power converter 116. In such an example configuration, current exchanged with the BESS 108 is adequately regulated by the power converter. However, in high capacity BESS(s) (e.g., greater than 100 kWh to less than 100 MWh) such as those utilized in grid scale storage, railway, and marine applications, a number of the battery strings/racks 112 configured in parallel are generally preferred. The plurality of battery racks 112 are connected to the high-power power converter 116, as shown in FIGS. 1 and 2, but the power converter 116 may not be able to control the current exchanged with the individual battery racks 112 in the presence of a current imbalance.

According to the system and method 100 of the present disclosure the current of distributed energy resources connected in parallel is balanced by controlling the SSCB(s) 106. Referring again to FIG. 1, each of the battery strings/racks 112 comprise an output connection 130. The SSCB(s) 106 are each attached to an associated one of the output connections 130. In FIG. 1, the battery bank(s) 110 comprise the one or more battery racks 112 operatively connected to a local bus 132 disposed within a bank container or housing. The battery bank(s) 110 may be operatively connected to the power converter 116 either directly or through the switchboard 118. In an example embodiment, the power converter 116 may have a capacity of 500 kW.

Figure 2:
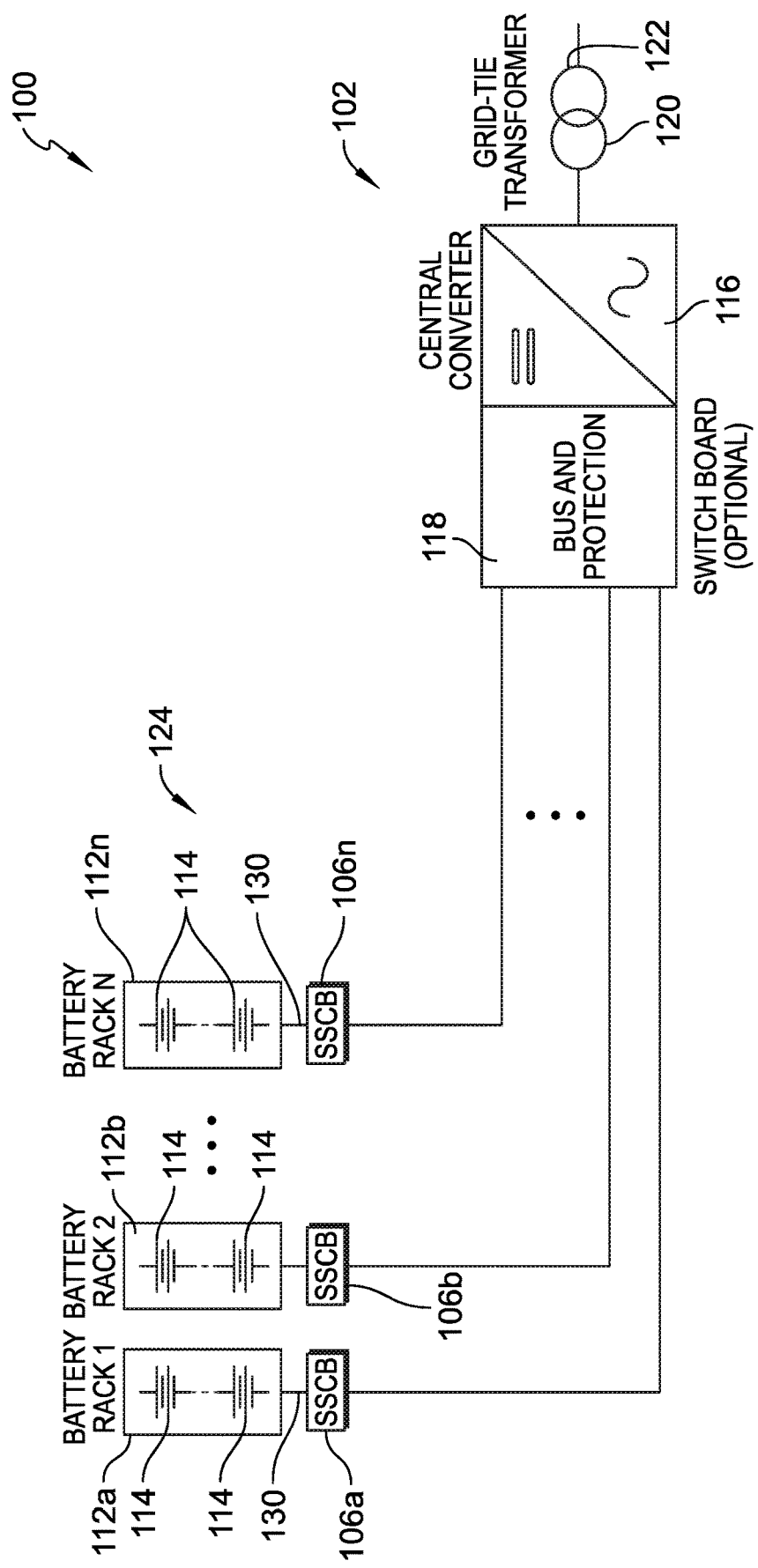
FIG. 2 is a diagram illustrating an example embodiment of the system and method wherein the battery racks are directly connected to the power conditioning module.

Referring now to FIG. 2, an embodiment of the system and method 100 is shown wherein the battery racks 112 are directly connected to the power conditioning module 102. As with the embodiment of FIG. 1, each of the battery racks 112 has one of the SSCB(s) 106 installed therewith. Additionally, or in the alternative, one or more of the SSCB(s) 106 may be installed in the switchboard 118 of the power conditioning module 102. In this embodiment, the SSCB(s) 106 may both control the battery rack current, if and when current control is desired, and interrupt overcurrent and/or thermal overloads in the system 100. The SSCB(s) 106 also provide improved protection for the batteries, cables, busbar, switches, converters, etc. comprising the system 100 because the SSCB(s) 106 enable fast fault interruption relative to conventional circuit breakers. The system and method 100 provides more reliable operation of the BESS 108 by selectively reducing the current for individual battery racks that are experiencing stress. This feature is further helpful to balancing temperature and state-of-charge (SOC) across a number of the battery racks 112. Still further, introduction of the SSCB(s) 106 is less expensive than DC/DC converters for each of the battery racks 112 or oversizing the quantity of the battery racks 112.

Figure 3:
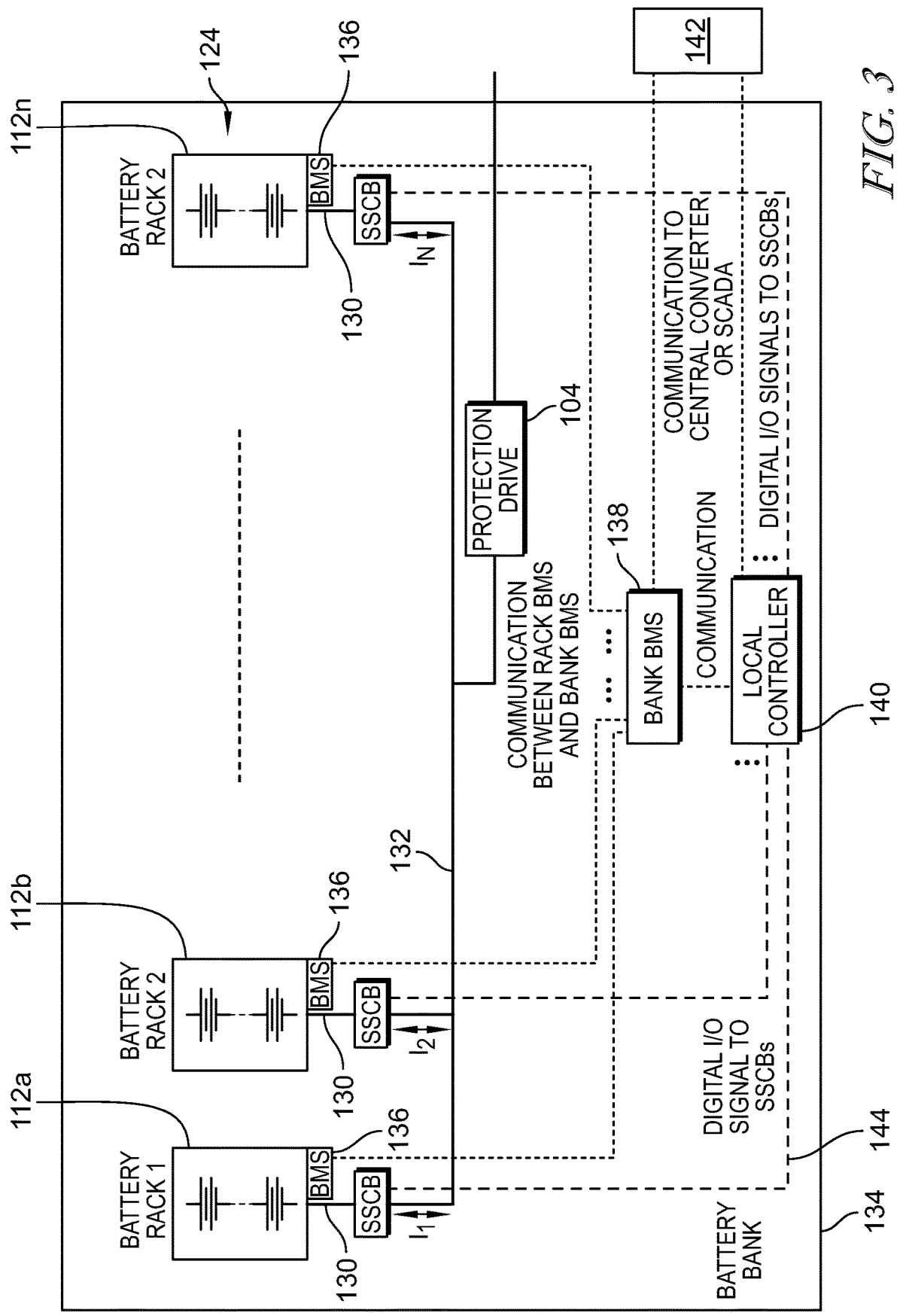
FIG. 3 is a diagram illustrating an example configuration of the SSCB(s) within an example battery bank.

Referring now to FIG. 3, the configuration of the SSCB(s) 106 within an example one of the battery bank(s) 110 is diagrammed. In this example, the SSCB(s) are associated with each of the battery racks 112. However, at the bank level, an SSCB may also be used as the circuit protection device 104 (FIG. 1). Still referring to FIG. 3, the battery bank 110 may include one or more rack battery management systems (BMS) 136 and a bank BMS 138. Each of the rack BMS(s) 136 communicates with the bank BMS 138, and the bank BMS 138 communicates with a local controller 140 and/or a system level controller 142 (e.g., a supervisory control and data acquisition (SCADA)). In an example embodiment, the system level controller 142 may be a networked controller that supervises a plurality of local controllers and battery banks. The control function of the SSCB(s) 106 may be integrated into the bank BMS 138, or the separate, local controller 140 may be included to communicate with the bank BMS 138, a controller of the power converter (not shown), and/or the system level controller 142. The rack BMS(s) 136 monitor a battery status and update the local controller 140 with respect thereto. The local controller 140 receives information from the bank BMS 138 in order to implement current balance control across the battery racks 112. The local controller 140 may also send the status of the SSCB(s) 106 and/or other suitable control and protection parameters to a system operator and/or the system level controller 142. Additionally, the local controller 140 may receive system commands from the system level controller 142 that direct operation of the SSCB(s) 106. In the example embodiment depicted by FIG. 3, the local controller 140 collects status information regarding the battery racks 112 through the bank BMS 138 and sends on/off digital control signals 144 to the selected SSCB(s) 106. The on/off digital control signals 144 may be pulse width modulation (PWM) signals or may implement another suitable control protocol. By controlling the on-state period and off-state period of the one or more solid state switch 146 (see FIG. 4) of the SSCB(s) 106, the system 100 influences the current distribution between and among the one or more battery racks 112.

Figure 4:
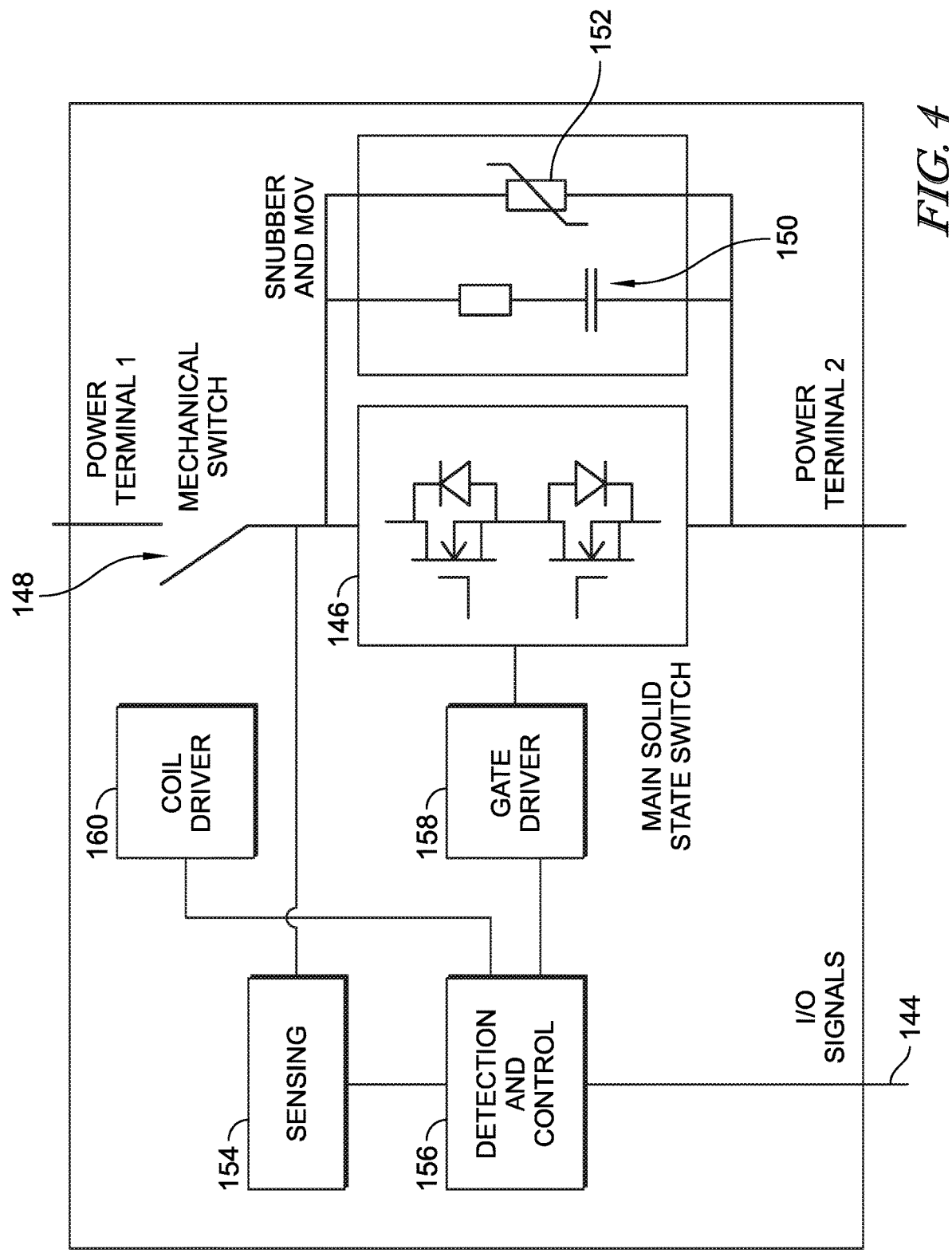
FIG. 4 is a diagram illustrating an example SSCB.

An example embodiment of the SSCB(s) 106 is diagrammed in FIG. 4. The SSCB 106 comprises the solid state switch 146 for current interruption and on/off control, a mechanical switch 148 for galvanic isolation, a snubber 150 (e.g., a resistor and capacitor), and a metal-oxide varistor (MOV) circuit 152 for voltage clamping protection of the main solid state switch 146. The SSCB 106 may also comprise a sensing circuit 154, a detection/control circuit 156, and a gate driver circuit 158. A coil driver circuit 160 may be operatively coupled with the mechanical switch 148 and configured to open and close same. During an example for on/off current control operations of the SSCB 106, the mechanical switch 148 may remain closed and the main solid state switch 146 may be switched on and off according to the on/off digital control signals 144 received by the SSCB 106 from the local bank controller 140 (see FIG. 3). Arcing may be prevented or instances thereof may be decreased in frequency and/or severity by the solid state switch 146 providing current interruption. Additionally, current interruption implemented by the solid state switch 146 may provide relatively quicker response speeds and/or a greater operational life of the circuit protecting component. The snubber 150 (again, a resistor and capacitor, for example) absorbs transient energy when the solid state switch 146 divides nominal battery current. During exemplary operation, the MOV circuit 152 is activated only when the current exceeds a high threshold level and is interrupted by a fault. As a result, even if the MOV circuit 152 is limited to relatively few operations, the entire SSCB 106 is not necessarily subject to the same limited number of operations because the MOV circuit 152 should not be activated often in comparison to the cumulative number of repeated operations for the SSCB(s) 106 and/or the system 100.

The SSCB(s) 106 also provide overcurrent protection when faults (e.g., short circuits, thermal overload, etc.) are present in the system 100. For example, if a short-circuit fault occurs at a connection to the local bus 132 in the battery bank(s) 110, the SSCB(s) 106 may sense a current (such as by the sensing circuit 154) that indicates a fault, and the detection/control circuit 156 identifies the current as a short-circuit fault. In response to fault detection, the SSCB(s) 106 turn off the solid state switch 146 with the gate driver circuit 158 associated therewith. The residual energy in the SSCB 106 is absorbed by the MOV circuit 152 and the snubber 150, and any residual current is damped towards zero. After a short delay, the mechanical switch 148 opens, when current is zero, and operates to provide galvanic isolation.

The fault interruption process according to the system and/or method 100 may be relatively fast, e.g., 10-100 micro-seconds. As a result of this interrupt speed, the fault current is limited to a low level and degradation of the batteries 114, due to occurrence of fault conditions, is avoided. High-speed overcurrent protection (i.e., fault interruption) also reduces the design requirements of the local bus 132 and other DC components, such as within the power conditioning module 102, because a lower DC short circuit withstanding capacity may be recommended for these components. In addition, exemplary tripping curves of the SSCB(s) 106 may have improved consistency as compared with conventional fuses. Still further, the tripping curve of the SSCB(s) 106 is not shifted due to ambient temperature change and/or over time due to aging, as may be the case with conventional fuses.

Manufacturing processes for fabricating batteries give rise to varied battery parameters because of quality control and/or cost limitations. Battery parameter variability may also result from degradation during operation due to different ambient conditions (e.g., temperature, locations, etc.), mismatch of cable and/or contact resistances, and different rates of degradation. As a result, current and/or thermal imbalances are very likely present within the large-scale BESS(s) 108 contemplated by the present disclosure because a number of the battery racks 112 are connected in parallel.

Figure 5:
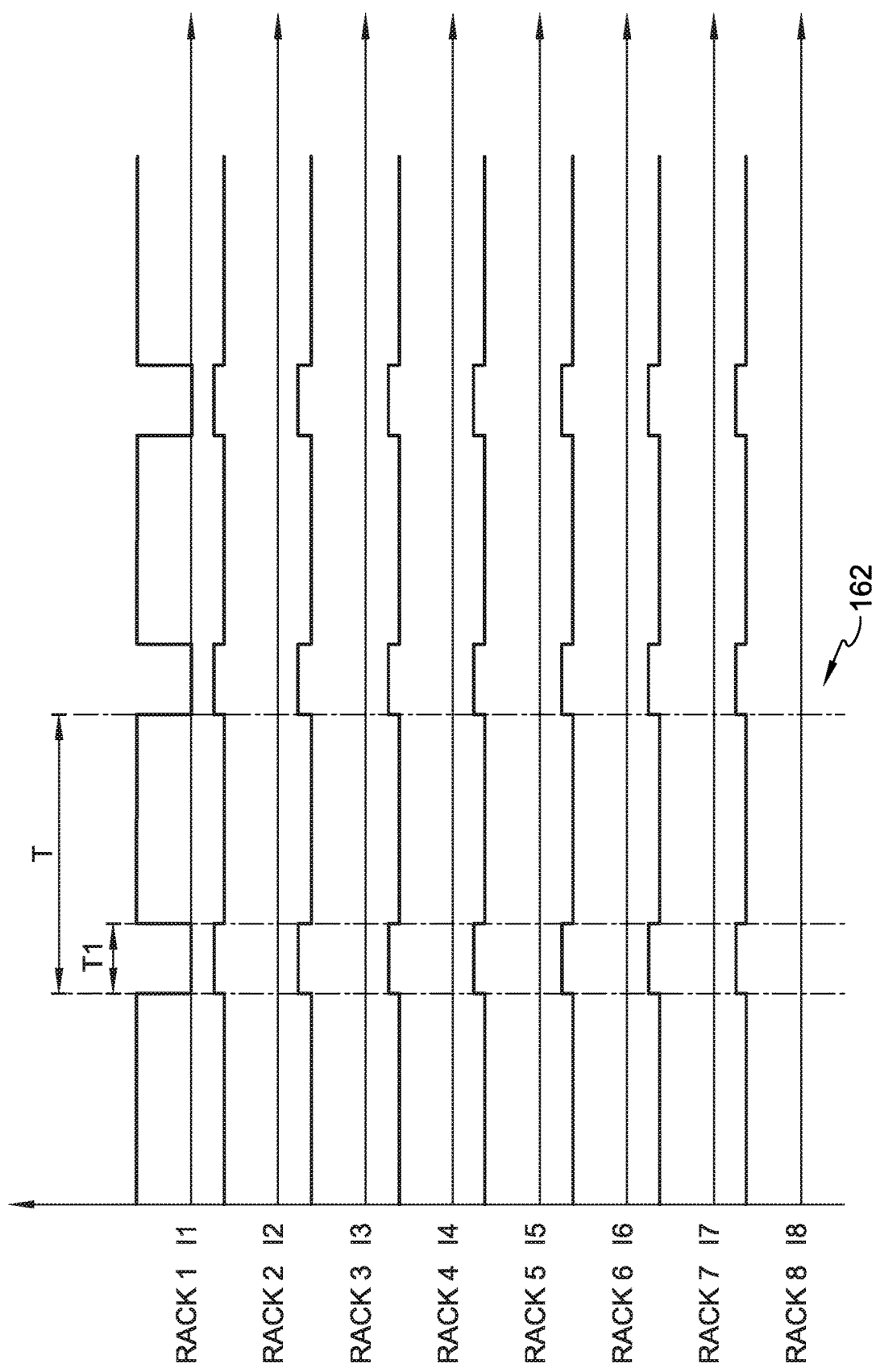
FIGS. 5-7 are current waveform graphs illustrating example currents passing through a number of battery racks over time in accordance with exemplary control schemes described with reference thereto.

Operation of an example embodiment is illustrated in FIG. 5 by a current waveform graph. This example may include charging or discharging while the power converter 116 operates according to a constant current control mode 162. First through eighth rack currents I1-I8 are shown. The rack currents I2-I8 are similar to one another; however, the rack current I1 is experiencing relatively greater current stress. Therefore, in order to balance the rack currents I1-I8, the first rack current I1 should be reduced. This reduction may be implemented by operating the solid state switch 146 within the SSCB 106 connected to the first battery rack 112 through which the first rack current I1 traverses. The SSCB 106 turns off the solid state switch 146 thereof to interrupt the current for period T1 (see FIG. 5), and turns the solid state switch 146 on again for the rest of the period in a control cycle period T. In an example embodiment, the control cycle period T may be in the range of seconds, which is close to a change rate of the system power profile, to minimize negative impacts on the subject battery rack 112. The constant current control mode 162 is activated for a sequence of cycles having the control cycle period T (e.g., one or more seconds) until any, or most, current imbalance issues are mitigated. During the constant current control mode 162 of the SSCB(s) 106, the average current of rack 1 ($I_{avg1}$) may be expressed as:

$$I_{avg1} = I_{avg} - I_{avg} \times T1/T \quad (1),$$

where $$I_{avg} = I_{dc}/(M \times N) \quad (2),$$

where N is the number of racks 112 in each of the battery bank(s) 110, and where M is the number of the battery banks 110. $I_{dc}$ is the total current regulated by the DC port of the power converter 116. This total current is typically requested by the SCADA 142 to provide certain charging or discharging power according to power demands placed on the BESS 108. The power converter 116 regulates the total current $I_{dc}$ of the BESS 108, but does not influence current distribution amongst the battery racks 112. However, with respect to Equation (1), modification of the off-period T1 and the control cycle T allows the SSCB(s) 106 to effectively reduce the first battery rack current I1, thereby, reducing the first average rack current $I_{avg1}$ below the overall average rack current $I_{avg}$. Adjustment of the rack currents also may address unbalanced thermal conditions by decreasing current to the racks 112 experiencing thermal overload or by increasing current to the racks 112 experiencing lower thermal conditions than desired for optimal charging conditions.

In the constant current control mode 162, reduction of the first rack current I1 (or another subset of the battery racks 112) may slightly increase the current delivered to the remaining subset of the battery racks 112. For example, the SSCBs 106 for controlling the battery rack currents I2-I8 may remain closed and conducting. The average rack currents ($I_{avg2}$ through $I_{avg8}$) of the remaining battery racks 112 may be expressed as:

$$I_{avg2-8} = I_{avg} + I_{avg} \times T_1/[T \times (M \times N - 1)] \quad (3).$$

Since subexpression (M×N–1) often develops a large denominator value, the current increase in the unmodified racks 112 is negligible. As a result, the system and/or method 100 implements effective current reduction for the targeted rack 112.

Figure 6:
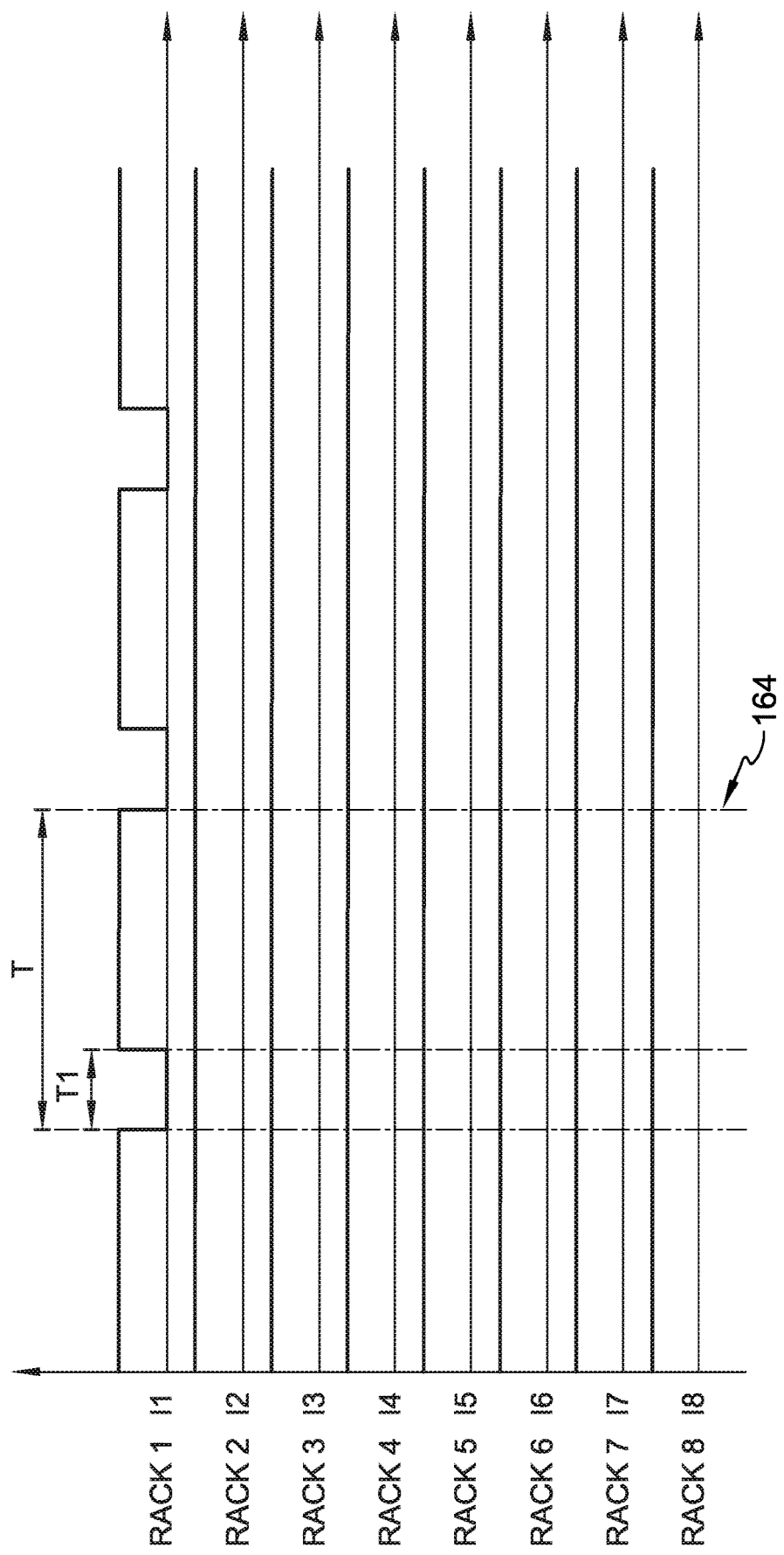

Referring now to FIG. 6, another example operation of the system and/or method 100 is illustrated by a current waveform graph. In FIG. 6, the power converter 116 operates in a constant voltage charging control mode 164 to further increase the state-of-charge of the battery racks 112. It may be desirable for constant voltage charging to follow constant current charging so as to increase the state-of-charge. In this example, the reduction of the rack current I1 is proportional to a ratio of T1 to T, and the unmanipulated subset of the racks 112 maintains the rack currents I2-I8 thereof unaffected.

Figure 7:
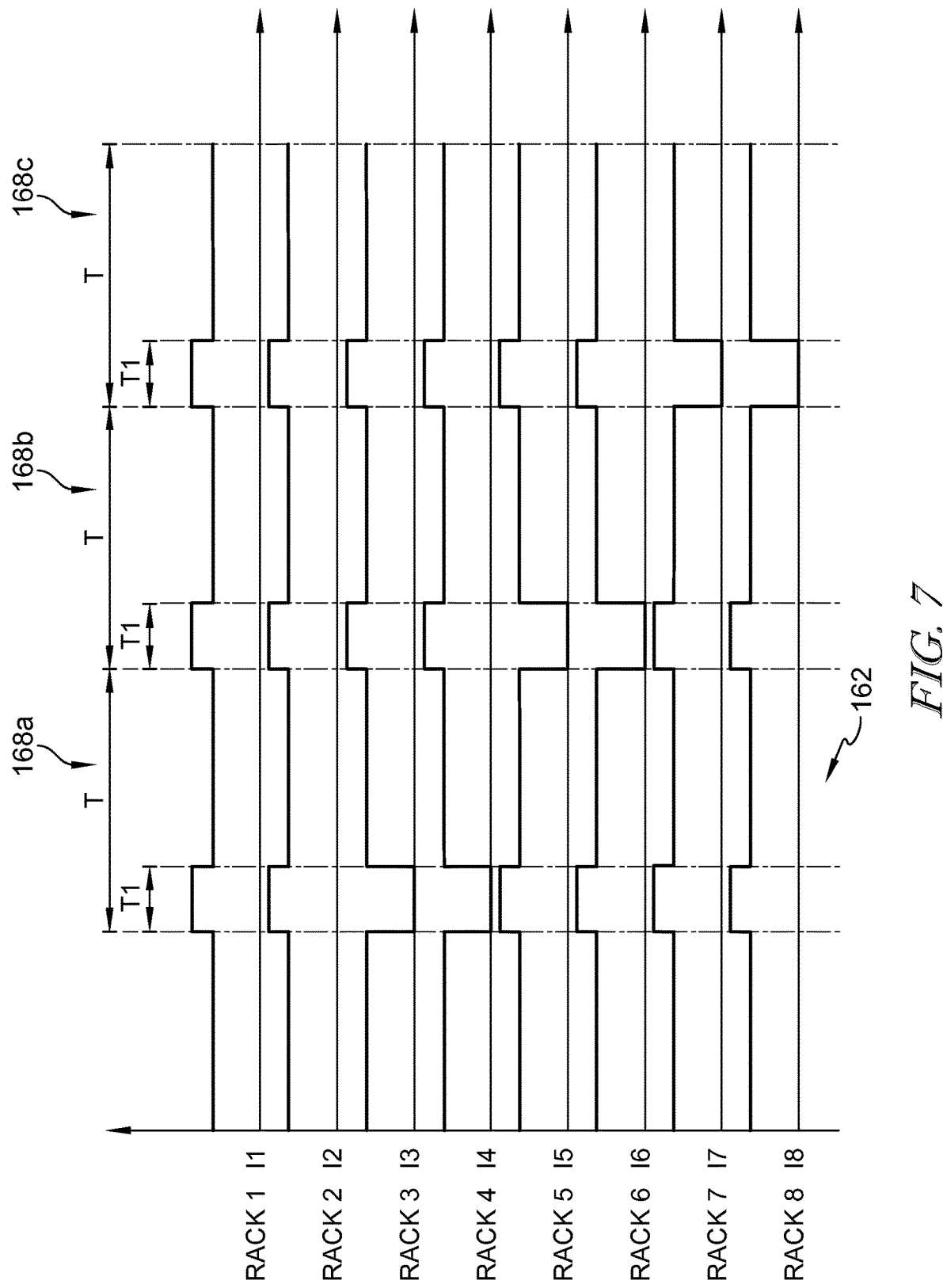

FIG. 7 is a current waveform graph illustrating one embodiment of the system/method 100 wherein the SSCB(s) 106 operate to increase current through a subset of the battery racks 112 while the power converter 116 is in the constant current control mode 162. In the example embodiment of FIG. 7, the first and second rack currents I1, I2 are targeted for increase while the other rack currents I3-I8 remain unimpacted. The battery racks 112a-112h are separated into groups. The present example embodiment has four groups (or subsets), and each group comprises two of the battery racks 112. This control cycle comprises one or more sub-control cycles 168 each having cycle period T. In exemplary embodiments the number of the sub-control cycles 168 is one fewer than the number of groups into which the battery racks 112 are separated. The present example; therefore, includes three of the sub-control cycles 168. The SSCB(s) 106 associated with the rack currents I1, I2 do not open during the sub-control cycles 168. In a first sub-control cycle 168a, the rack currents I3, I4 are interrupted by the SSCB(s) 106 corresponding thereto for a period T1. During the same sub-control cycle 168a, the other rack currents I1, I2, I5-I8 increase. In the second sub-control cycle 168b, the rack currents I5, I6 are interrupted by the associated SSCB(s) 106 for the period T1 thereby increasing the other rack currents (including I1, I2). Then, in the third sub-control cycle 168c, the rack currents I7, I8 are interrupted for the period $T_1$ thereby increasing the other rack currents (including I1, I2).

Therefore, the rack currents I1, I2 are increased three times over the period 3T for each full control cycle. As a result, the rack currents I1, I2 develop a significant increase in average current amplitudes thereof. Likewise, the rack currents I3-I8 each undergo a current reduction for one period and increases for two periods, thereby compensating for a single period of reduction. Accordingly, the average rack current $I_{avg}$ is maintained, while the average rack currents $I_{avg3}$-$I_{avg8}$ are slightly reduced as compared with normal/optimal operation. However, the average rack currents $I_{avg1}$, $I_{avg2}$ are increased, as expressed by:

$$I_{avg1-2} = I_{avg} + I_{avg} \times T_1/[T \times (Y-1)] \quad (4).$$

The relatively small reduction of the average rack currents $I_{avg}$-$I_{avg8}$ may be expressed with:

$$I_{avg3-8} = I_{avg} - I_{avg} \times T_1/[T \times (Y-1)^2] \quad (5)$$

The influence of current control for the targeted battery racks 112a, 112b is three times the modification undergone by the remaining battery racks 112c-112h. T1, T, the number of target battery racks, and/or the ratio of target battery racks to total battery racks may be customized, alone or in numerous combinations, such that rack currents may be effectively controlled. Still further, the fast response time of the SSCB(s) 106 limits the peak fault current thereby mitigating internal damage to the batteries 114. This feature also benefits the BESS(s) 108 by reducing the desired short-circuit withstanding capacity of cables, busbar, switches, converters, etc., as mentioned hereinabove.

In an example embodiment, the SSCB(s) 106 may comprise adjustable tripping curves. It is not uncommon for the BESS(s) 108 to undergo configuration changes, e.g., addition of batteries, removal of batteries, inclusion of batteries with different battery parameters, etc. Conventionally, these configuration changes would entail re-selection and replacement of protection devices with fixed tripping curves, such as fuses. However, because the SSCB(s) 106 facilitate adjustable and customizable tripping curves replacement thereof may be delayed and/or forgone. The time current curve (TCC) of the SSCB(s) 106 may be reconfigured according to updated parameters of the batteries 114 and the overall BESS 108.

Conventional fuses have fixed TCCs or melting curves, which present difficulties in achieving, with fuses, full coordination and/or selectivity at all fault currents. The SSCB(s) 106 can provide ultrafast, i.e., <1 millisecond, protection to prevent damage to the batteries 114 from high fault current and/or uncontrolled thermal events. The SSCB(s) 106 may provide adjustable tripping curves, as noted hereinabove, to facilitate circuit protection consistency, reliability, and/or protection coordination during various and numerous fault conditions.

Figure 8:
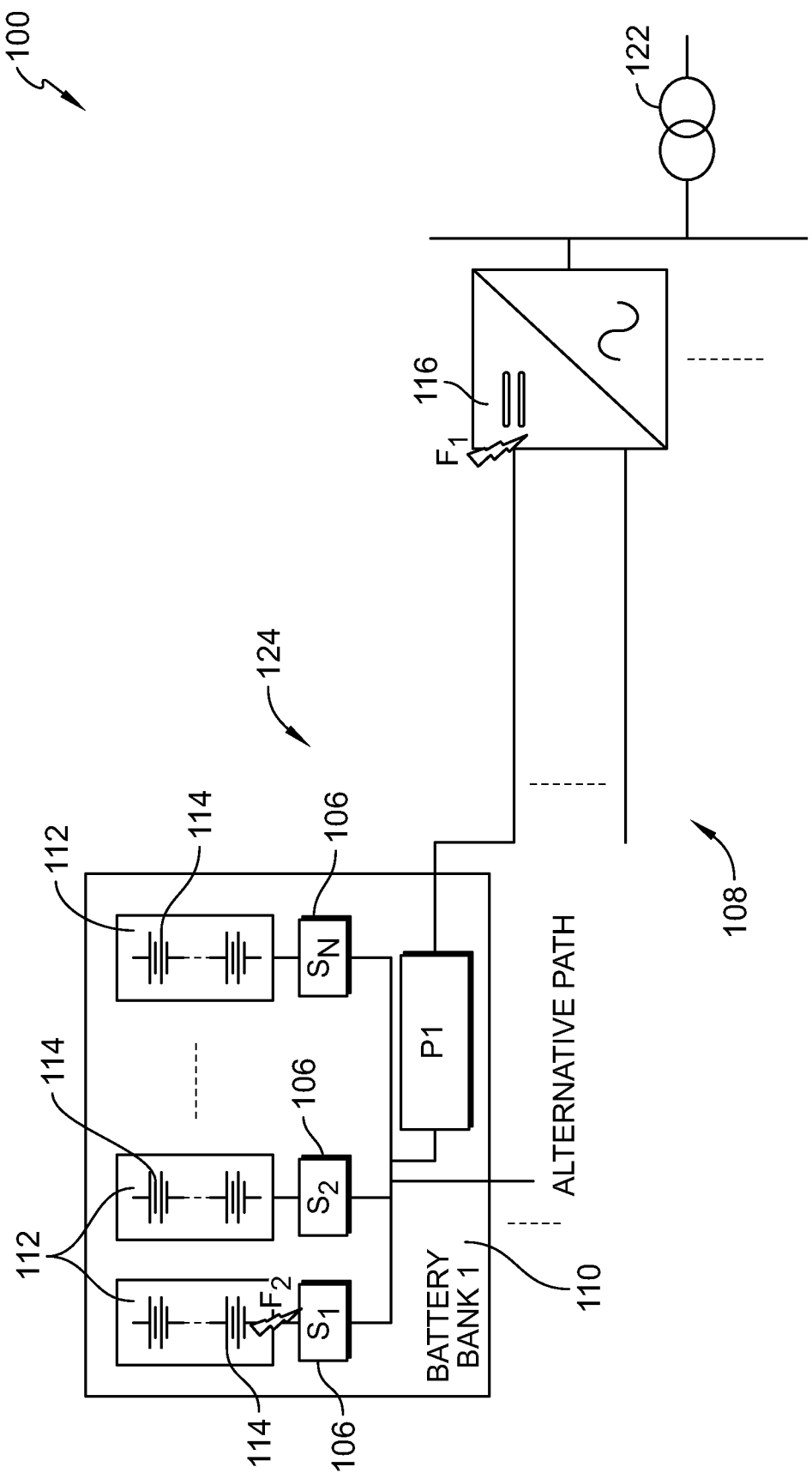
FIG. 8 is a diagram illustrating an example embodiment of the system and method identifying the relative location of first and second faults F1, F2 and circuit protection devices.

Referring now to FIG. 8, an example of the BESS 108 is diagrammed to illustrate the relative location of first and second faults F1, F2. The first fault F1 is located at a utility power side of the BESS 108 and the second fault F2 is located at the battery side of the BESS 108. P1, in FIG. 8, may be a fuse, a mechanical circuit breaker, or one or more of the SSCB(s) 106. False tripping may occur or full protection coordination may be compromised when fuse or mechanical circuit breakers are disposed downstream of a faster-response SSCB, because the SSCB(s) 106 reach tripping thresholds before a downstream fuse begins to arc or a mechanical circuit breaker starts to open.

FIGS. 9A and 9B illustrate adjustable tripping characteristics of the SSCB(s) 106 that enable selectivity and/or customization. In an example embodiment, P1 of FIG. 8 represents a fuse and the protection responses at the first and second faults F1, F2 for the fuse are shown in FIG. 9A. The TCCs of the SSCB(s) 106 at S1 and S2 are below the TCC of P1 because of the lower nominal current of S1 and S2 as compared with P1. At the second fault F2, the SSCB 106 correlated with S1 trips first because of a high fault current. At the first fault F1, the fuse represented by P1 trips first due to high fault current. Both the SSCBs 106 represented by S1 and S2 may also trip if tripping thresholds thereof are reached before the fuse P1 begins to arc. Under certain conditions, for example, if the TCCs of the SSCB(s) 106 at S1 and S2 are low enough, S1 and S2 may even trip before the fuse at P1 trips. As mentioned hereinabove, selectivity is sacrificed if fuses with fixed TCCs are implemented at the batteries 114 (not shown). Instead, when the SSCBs 106 are implemented, the TCCs of S1 and S2 may be shifted upwards at F1 to facilitate desired protection coordination and establish a sufficient time difference between the trippings of the downstream fuse P1 and the upstream SSCBs 106 of S1 and S2. Besides the adjustment of the TCCs, a re-closing control may be included for the SSCB(s) 106 to assist in protection coordination. Accordingly, the SSCB(s) 106 may be reclosed once a fault condition is obviated by P1. The re-closing may be executed before the isolator (the mechanical switch 148) in one or more of the SSCB(s) 106 is activated.

In another example embodiment, P1 of FIG. 8 represents a relatively fast mechanical circuit breaker. In this embodiment, instantaneous overcurrent protection may be implemented for short circuit protection. The time domain tripping responses at the first and second faults F1, F2 are shown in FIG. 9B. Threshold currents through the SSCB(s) 106 at S1 and S2 are lower than a current through the mechanical breaker of P1 because of the lower nominal current of the SSCB at S1 and S2 as compared with the mechanical breaker represented by P1. At the first fault F1, the threshold current of the SSCB(s) 106 is increased to ensure adequate protection coordination and sufficient time differences, i.e., delays, between the trippings of the downstream mechanical circuit breaker P1 and the upstream SSCB(s) 106 at S1 and S2.

In practical applications, fault currents flow through the SSCB 106 of S1 in opposing directions during the first fault and the second fault F1, F2. Adjustment of the TCC or the threshold of the SSCB 106 at S1 may be realized once the SSCB 106 of S1 senses reversal of the fault current directions against the reference directions with one or more analog circuit components. In response to the sensing by S1, the system level controller 142 may then issue the commands to S2, . . . Sn to change the TCCs and overcurrent thresholds thereof. With the SSCB(s) 106 disposed proximal each of the batteries 114, protection coordination enables a circuit protection device closest to a fault location to open before other, downstream circuit protection devices. Thus, the impacts of overload conditions are minimized and the reliability and availability, i.e., up time, of the BESS 108 is improved.

The embodiment(s) detailed hereinabove may be combined in full or in part, with any alternative embodiment(s) described.

INDUSTRIAL APPLICABILITY

The above disclosure may represent an improvement in the art by providing current control and/or balance and short-circuit protection for large-scale direct parallel distributed DC energy resources, including but not limited to battery energy storage systems, fuel cell systems, supercapacitor systems, hybrid energy storage systems, and/or photovoltaic farms. Balance and control of battery rack current, temperature, state-of-charge and/or other battery parameters are significant for predicting and/or extending the serviceable life of batteries in large-scale BESS(s). Current imbalance may originate from battery cell manufacturing and/or may be related to some other factors encountered during realistic BESS operation, e.g., varying location of battery cells, variations in ambient temperature, and variation in aging speed amongst numerous battery cells. Still further, observed current imbalances increase when the degradation rates of subject battery racks are different. Current imbalances experienced by individual racks may further speed up the aging of batteries and increase the likelihood of safety issues. In turn, the growing variations result in more current imbalances thereby further accelerating degradation of batteries and more rapidly increasing current imbalances. Therefore, the presently disclosed system and method is an improvement in the art because of increased current controllability for individual battery racks within a large-scale BESS and/or other battery system. The protection and control described in the present disclosure may be extended to distributed AC energy resources.

While some implementations have been illustrated and described, numerous modifications come to mind without significantly departing from the spirit of the disclosure, and the scope of protection is only limited by the scope of the accompanying claims.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

It should be understood that the described instructions, operations, and systems can generally be integrated together in a single software/hardware product or packaged into multiple software/hardware products.

The use of the terms "a" and "an" and "the" and "said" and similar references in the context of describing the invention (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

The invention claimed is:

1. An energy storage system comprising:
   a power source;
   a plurality of energy storage components;
   a solid state circuit breaker disposed between the power source and the plurality of energy storage components such that electrical power is exchanged between the power source and the plurality of energy storage components through the solid state circuit breaker; and
   a controller configured to operate the solid state circuit breaker to (i) control current exchanged with the plurality of energy storage components and (ii) protect the plurality of energy storage components from the power source during a fault condition, wherein the controller is configured to operate the solid state circuit breaker to manipulate current exchanged with a first subset of the plurality of energy storage components in response to an imbalance in at least one of (i) a state of charge of the plurality of energy storage components and (ii) a temperature of the plurality of energy storage components.

2. The energy storage system of claim 1, wherein the plurality of energy storage components each comprise one or more batteries configured in parallel.

3. The energy storage system of claim 2, wherein the controller is configured to operate the solid state circuit breaker in response to at least one of (i) a state of charge of the one or more batteries and (ii) a temperature of the one or more batteries.

4. The energy storage system of claim 1 further comprising a plurality of solid state circuit breakers, wherein the controller is configured to separately operate each of the plurality of solid state circuit breakers to selectively decrease current to the first subset of the plurality of energy storage components.

5. The energy storage system of claim 4, wherein decreasing current to the first subset of the plurality of energy storage components increases current to a second subset of the plurality of energy storage components.

6. The energy storage system of claim 5, wherein the controller is configured to select the first and second subsets of the plurality of energy storage components in response to the imbalance.

7. The energy storage system of claim 6, wherein the controller is configured to interchange the first and second subsets of the plurality of energy storage components.

8. The energy storage system of claim 4, wherein the plurality of solid state circuit breakers each comprise a solid state switch operable to control current flow through that solid state circuit breaker.

9. The energy storage system of claim 4, wherein the plurality of solid state circuit breakers each have an adjustable time current curve.

10. The energy storage system of claim 9, further comprising at least one of a fuse and a mechanical circuit breaker disposed between the power source and the plurality of solid state circuit breakers, wherein the controller is configured to adjust the adjustable time current curve of each solid state circuit breaker to develop circuit protection in conjunction with the at least one of the fuse and the mechanical circuit breaker.

11. A method of protecting an energy storage system, the method comprising:
    directing power through a solid state circuit breaker to exchange the power between a power converter and a plurality of energy storage components;
    detecting a state of charge and a temperature for each of the plurality of energy storage components;
    operating the solid state circuit breaker to control the state of charge and the temperature for each of the plurality of energy storage components; and
    controlling the solid state circuit breaker to protect the plurality of energy storage components from a fault condition comprising one of overcurrent, short circuit, and thermal overload.

12. The method of claim 11, further comprising controlling the solid state circuit breaker to protect the plurality of energy storage components from an unbalanced condition comprising at least one of unbalanced current and unbalanced temperature.

13. The method of claim 12 further comprising:
    separating a plurality of solid state circuit breakers into a plurality of subsets; and
    controlling one subset of the plurality of subsets differently from another subset of the plurality of subsets in response to at least one of the fault condition and the unbalanced condition.

14. The method of claim 13 further comprising:
selecting a first subset and a second subset of the plurality of subsets.

15. The method of claim 14 further comprising:
decreasing current to the first subset of the plurality of subsets; and
causing increased current in the second subset of the plurality of subsets.

16. The method of claim 11, wherein the solid state circuit breaker includes a solid state switch, and wherein the method further comprises:
operating the solid state switch to control current flow through the solid state circuit breaker.

17. A circuit protection system comprising:
a power source electrically coupled with a load;
a first circuit breaker having an adjustable time current curve;
one of a second circuit breaker or a fuse, the second circuit breaker or fuse having a fixed time current curve; and
a controller coupled to the first circuit breaker and configured to adjust the adjustable time current curve in response to protection parameters,
wherein a first overload threshold for the first circuit breaker is determined by the adjustable time current curve, and wherein a second overload threshold for the second circuit breaker or the fuse is determined by the fixed time current curve.

18. The circuit protection system of claim 17, wherein the second overload threshold is greater than the first overload threshold.

19. The circuit protection system of claim 18, wherein the first circuit breaker is a solid state circuit breaker and is reset by the controller in response to cessation of overload conditions.

20. The circuit protection system of claim 19, wherein the controller adjusts the adjustable time current curve of the first circuit breaker in response to replacement of the second circuit breaker or the fuse.

* * * * *